3,832,207
CALCIUM SULFITE COMPOSITIONS FOR PLASTIC COMPOSITE

Sueo Machi, Takasaki; Yasushi Matui, Satte-Machi; Hirondo Kurihara, Takasaki; Yoshiharu Hibi, Yokohama; Toshiaki Yagi, Takasaki; Takayuki Shinano, Yokohama, and Masaaki Takehisa, Takasaki, Japan, assignors to Japan Atomic Energy Research Institute, Tokyo, Maruzen Oil Company Limited, Osaka, and Mitsubishi Kakoki Kaisha Ltd., Tokyo, Japan
No Drawing. Filed Dec. 29, 1972, Ser. No. 319,753
Claims priority, application Japan, Dec. 29, 1971, 46/3,441; Jan. 14, 1972, 46/5,900
Int. Cl. C08h 17/00; C08j 1/34, 1/36
U.S. Cl. 106—308 M                              12 Claims

ABSTRACT OF THE DISCLOSURE

A calcium sulfite composition having affinity with a thermoplastic resin is obtained by adhering a polysulfone resin to the surface of a calcium sulfite powder. The composition is suitable for preparing a calcium sulfite-plastic resin composite.

BACKGROUND OF THE INVENTION

(1) Field of the Invention

The present invention relates to a calcium sulfite composition having affinity with thermoplastic resin, a method of improving surface properties of calcium sulfite and a process for preparing the calcium sulfite composition. Particularly, the invention relates to an improved calcium sulfite composition in which affinity to thermoplastic resin is increased by improving the hydrophilic surface of a calcium sulfite powder, which is to be used to prepare a composite having thermoplasticity by mixing the calcium sulfite with thermoplastic resin.

(2) Description of the Prior Art

In recent years, a large quantity of calcium sulfite and the resulting gypsum is produced as a by-product in various processes for desulfurization or for trapping of sulfur dioxide, since the exhaust of oxides of sulfur to the atmosphere is judiciary restricted. At present, the application of the gypsum obtained in the above processes is limited to only few kind of materials such as gypsum board and the like, and the development of new applications for enormous quantities of the material is being required. On the other hand, the chemical industries for polymers have remarkably been developed, and various kinds of thermoplastic resins such as polyethylene and polyvinyl chloride are produced in large quantities.

With the above mentioned situations, the composite of gypsum with thermoplastic resin calls the attention of the various industrial fields and it has been known that the mixture of gypsum, having two hydrate water molecules, with polyethylene, polyvinyl chloride or the like in the presence or absence of a reasonable additive results in an excellent composite (for instance, Japanese Patent Publication No. 29,377/1971). However, gypsum is a typical material which has a hydrophilic surface, and polymer plastics represented by polyethylene is a material which has a non-hydrophilic surface, therefore, it has been proposed that ethylene-propylene or styrene-butadiene synthetic rubber, or natural rubber be added, at 5 weight percent at most, to the above mentioned composite (for instance, Japanese Patent Publication No. 29,613/1971). Moreover, another method has been also proposed, which attempts to increase the dispersion of inorganic material and the strength of the composite, by adding a special amphoteric surfactant comprising a metallic salt in an amount of 0.5–5 weight percent of the used polymer, in the production of such inorganic-organic composite (for instance, Japanese Patent Publication 29,374/1971).

In research for gypsum-polymer composites, the inventors have noted the use of calcium sulfite instead of gypsum. However, there have been some fears that calcium sulfite in its polymer resin composite will be gradually oxidized or chemically modified and the properties of the composite impaired through the exposure to air and/or water. The inventors have unexpectedly found that the above fears can be dissolved by employing a calcium sulfite treated with a polysulfone resin and improved in its hydrophilic surface properties, since the composite comprising thermoplastic resin and calcium sulfite treated with a polysulfone have good affinity to each other to form a compact and intimate composite. The fears relating to oxidation and/or chemical change in the calcium sulfite-plastic composite have substantially been eliminated, and further, the composite exhibits excellent properties such as enhanced mechanical strength.

Incidentally, calcium sulfite is obtained as the intermediate product in producing gypsum from sulfur dioxide and calcium hydroxide. Thus, it is economically advantageous to use calcium sulfite instead of gypsum.

SUMMARY OF THE INVENTION

One object (A) of the present invention is to provide the calcium sulfite composition for the composite use and its method of preparation by which a calcium sulfite-thermoplastic resin composite with improved properties is produced by improving the surface property of the calcium sulfite on which polysulfone is strongly adhered which has an intermediate hydrophilic property between those of calcium sulfite and thermoplastic resin. This may be accomplished for example, by the copolymerization reaction of an olefinic unsaturated monomer with sulfur dioxide on the surface of the calcium sulfite, by irradiating an ionizing radiation or by applying a radical initiator to a system comprising calcium sulfite, sulfur dioxide and unsaturated monomer; thus being prepared a mixture of calcium sulfite a hydrophilic surface with thermoplastic resin with a hydrophobic (oleophilic) surface wherein both materials well adhere to each other.

Another object (B) of the present invention is to provide the calcium sulfite composition for blend use for thermoplastic resin and its method of preparation which composition results in a good dispersibility even to a polyolefin which is a nonpolar material and good processing characteristics of the mixture and, furthermore, improvements of the properties of the composite as a final product, by treating the surface of calcium sulfite with a solution of polysulfone resin which has an intermediate hydrophilic property between those of calcium sulfite and thermoplastic resin. Thus there is prepared an excellent composite material comprising a mixture of calcium sulfite and thermoplastic resin.

A further object of the present invention is to provide a method of improving the surface properties of a calcium sulfite to be used for preparing the above calcium sulfite-thermoplastic resin composite.

Description of the Preferred Embodiment

[A] The above object (A) of this invention is preferably performed in the following manner.

The polysulfone resins herein used are those having groups shown by (—SO$_2$—) in the main chain of the polymer. While many kinds of polysulfone resins and their methods preparation have been well known, alternate copolymers comprising an olefin and sulfur dioxide can preferably be used for the purpose of the present invention from the viewpoints of its properties and cost. Copolymers comprising sulfur dioxide and a vinyl compound such as styrene, vinyl chloride and the like or an allyl compound such as allyl chloride are also used. It has been known that the formation reaction of polysulfone is initiated by any means such as irradiation with an ionizing radiation, the irradiation with light, the application of an initiator which releases free radicals upon its decomposition, such as azoisobutyronitrile, and the like, to the above mixture of the monomer. In the polymerization reaction in the presence of calcium sulfite, the irradiation with light is not so reasonable since the effective initiation of the reaction is restricted only in the surface layer of the mixture and the reaction can not be effectively initiated in the inside of the mixture. The initiation of the reaction by means of an ionizing radiation is a preferable method, since an ionizing radiation, especially γ-rays, X-rays or the like, has a strong penetration power, and results in homogeneous initiation of the reaction anywhere in the system of the reaction mixture. Particularly, this method can effectively be applied to the formation reaction of polysulfone in which the limiting temperature of the polymerization reaction is low, since the irradiation of an ionizing radiation induces initiation of the reaction, independent of the temperature. In the process with the application of a radical initiator, the decomposition rate of the initiator is generally increased at the higher temperature. On the other hand, the rate of the formation reaction of polysulfone is decreased when the temperature is elevated in the neighborhood of room temperature, therefore, the effect of the initiator is reduced when once the temperature control is missed. However, this method can industrially be applied with sufficient favor when the reaction apparatus and the reaction system are reasonably selected. Incidentally, in the present invention, it is also possible to use the polymerization medium which is a poor solvent for the formed polysulfone.

Hence, in the polymerization reaction in the presence of calcium sulfite, which is a fundamental conception of this invention, the reaction takes place on the surface of the calcium sulfite, or the polysulfone which is formed in the neighbourhood of the calcium sulfite is adhered or precipitated on the surface of the calcium sulfite during the polymerization reaction, and very strong bonding is formed between the calcium sulfite and the polysulfone. Although a study of the reasons for such strong bonding is in progress, the following is considered to be one of the reasons. That is, it is estimated that, from the general formula shown by

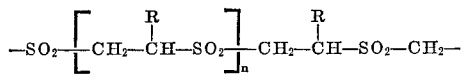

(where R typically means hydrogen atom, the other atom or an alkyl group), this material may physically be bonded to calcium sulfite through —SO$_2$— group and may be physically bonded to polymer through —CH$_2$—CHR— group.

It is possible to use the olefins having about 2-12 carbon atoms as a raw material for poly(olefinsulfone) in this invention, from the viewpoint of industrial yield and of the properties of the formed polysulfone; and particularly it is preferable to use an α-olefin containing about 2-8 carbon atoms. However, it is also permitted to use a mixed olefin which comprises olefins containing different number of carbon atoms or non-alpha-olefins such as β-olefin. The composition of the present invention is preferably applicable to a thermoplastic resin, preferably to polyolefins.

[B] The above object (B) of this invention is preferably performed in the following way.

The polysulfone resins used in this invention refers to those containing groups shown by (—SO$_2$—) in the main chain of the polymer. While many types of polysulfone resins and methods for their preparation have been well known, alternate copolymers of olefin with sulfur dioxide, or copolymers of vinyl compounds such as styrene, vinyl chloride or the like and/or allyl compounds such as allyl chloride, with sulfur dioxide, are favorably applied to the purpose of the present invention because of their properties and costs. The formation reaction of polysulfone can be initiated, by irradiation with an ionizing radiation, irradiation with light and the use of initiators such as azobisisobutyronitrile which releases free radicals through its decomposition, or by addition of silver nitrate, lithium nitrate or the like. While polysulfone resin which is produced by any initiating method can be used for the purposes of the present invention, irradiation of an ionizing radiation can favorably be used, by which the reaction rate at the initiation does not depend on temperature, since the formation reaction of polysulfone generally proceeds with low limiting temperature.

Since the purpose of the present invention is to change the properties of the hydrophilic surface of a hydrated or anhydrous calcium sulfite, a small quantity of polysulfone is generally used if it is sufficient to change the properties of the surface of calcium sulfite. Excess polysulfone over that required should not be applied, because it causes coloring of the calcium sulfite-thermoplastic resin composite as final product due to heating in the production process. Therefore, it is preferable, in order to cause small amounts of polysulfone to adhere homogeneously onto the surface of calcium sulfite, that the polysulfone which is solution in a suitable solvent is selected from the polysulfones, and the polysulfone solution is applied onto the surface of calcium sulfite by immersing or spraying, then the calcium sulfite is dried.

The polysulfones soluble in suitable solvents include a series of poly(olefinsulfones, for instance, such as poly(propylenesulfone), poly(butene-1 sulfone), poly(butene-2 sulfone), poly(pentenesulfone) and poly(hexenesulfone), poly(propylenesulfone), poly(butenesulfone) and the like, which are prepared from lower olefins, should be used with a polar solvent suitably selected from a group comprising dimethylsulfoxide, chloroform, tetrahydrofuran, dioxan, acetone, liquid sulfur dioxide and the like. Poly(octenesulfone), poly(decenesulfone) and the like, which are prepared from higher class olefins, can be used with nonpolar solvents such as cyclohexane, butylacetate, toluene, xylene, ethylbenzene and the like in addition to the above mentioned polar solvents. Polysulfones which contain a vinyl compound, such as styrene, vinyl chloride and the like, or allyl compound such as allyl chloride and the like, as a constituent, can also be used with solvents similar to those for the above mentioned poly(olefinsulfones).

Mixed solvents comprising suitably selected solvents from the above mentioned groups of solvents can be used. Further, an embodiment of the present invention is constituted also by the method in which calcium sulfite is treated by sulfur dioxide, olefins, vinyl compounds, allyl compounds and these mixtures which dissolve the polysulfone obtained in the intermediate stage of polysulfone formation reaction.

The composition according to the present invention including the above objects (A) and (B) can be favorably applied to usual thermoplastic resins such as polyolefins, PVC, polystyrene, ABS resin and the like, preferably to polyolefin. The polyolefins used in this invention include crystalline polyolefins such as polyethylene, polypropylene and the like and the copolymers, in which olefin is contained as a constituent and which have similar properties to those of crystalline polyolefins, such as ethylene-vinyl acetate copolymers, ethylene-vinyl chloride copolymer, low-degree chlorinated polyethylene and the like.

Calcium sulfites to be employed in this invention include a hydrated or anhydrous calcium sulfite and are generally represented by CaSO$_3$·½H$_2$O which shows amorphous particles under microscope. The amount of a polysulfone resin to be adhered to calcium sulfite is generally in the range of about 0.01-5% by weight of calcium sulfite.

The calcium sulfite composition of the present invention is employed in the amount of generally 20-95%, preferably 40–90% by weight of the calcium sulfite-thermoplastic composite.

The present invention is further explained, hereinafter, with reference to the following examples, but the invention is not limited to these examples.

Example 1

Calcium sulfite powder of reagent grade (209.5 g.) was charged in an autoclave having an inner volume of 500 cc., and the air in the autoclave was sufficiently replaced with gaseous propylene, then, 6 g. of commercially available liquid sulfur dioxide was loaded. Gaseous propylene was loaded in the autoclave in an amount of 36 g. and the content was irradiated by Co-60 γ-rays with the dose rate of $8 \times 10^4$ rad./hr. for 1 hour, at 10° C. After the irradiation, unreacted gas was released and the unreacted gas was entirely removed by keeping the system under reduced pressure. The increase in weight of the calcium sulfite after the above treatment was less than about 1%.

The calcium sulfite, whose surface properties was improved by the above treatment, was mixed with low density polyethylene pellets in the weight ratio of 50:50, and was blended (=kneaded) for 10 min. at 160° C. at the rotating speed of roller of 30 r.p.m., using Plasticorder roller mixer, Brabender Co., West Germany. The blended material was molded into a sheet 1 mm. thick, by hot pressing at 160° C. Test pieces shaped as JIS (Japan Industrial Standards) No. 1 dumbbells were stamped out from the above sheet which is of pure white opaque color and has the appearance in surface gloss and feeling similar to that of polyethylene, and tensile tests were carried out. The result in average of 5 tests is shown in Table 1. The tensile speed rate is 5 mm./min.

TABLE 1

The characteristics of the composite comprising calcium sulfite, whose surface was treated with poly(propylenesulfone), and radiation polymerized polyethylene.

| | Tensile strength (kg./cm.²) | Elongation at breaking point (percent) |
|---|---|---|
| Low density polyethylene, surface treated calcium sulfite | 125 | 16.3 |
| Low density polyethylene, untreated calcium sulfite | 115 | 15.6 |
| Low density polyethylene | 102 | 21 |

Thus, by treating the surface of calcium sulfite according to the present invention, it is obviously shown that the characteristics of the composite comprising polyethylene-calcium sulfite were improved.

Example 2

A glass vessel having an inner volume of 200 cc. was charged with 103.4 g. of the same calcium sulfite as used in Example 1 and the air therein was sufficiently removed under vacuum, followed by charging 6 g. of butene-1 and 6.5 g. of sulfur dioxide at a low temperature. The glass vessel was put in 10° C. thermostat vessel and irradiated with gamma rays from Co-60 at the dose rate of $1.5 \times 10^5$ roentgen/hr. for 45 minutes. Then, the unreacted butene-1 and sulfur dioxide were removed. The increase in weight of the treated calcium sulfite after the treatment was about 1.9%.

The treated calcium sulfite was mixed with the same low density polyethylene as used in Example 1 in the weight ratio of 1:1, and was kneaded at 160° C. The resulting composite was molded into 1 mm. thick sheet by hot pressing, which was pure white and had the appearance in surface gloss and feeling similar to that of polyethylene. Test pieces were stamped out from the sheet and tensile tests were carried out. The tensile strength was 130 kg./cm.² and elongation at breaking point was 17.8%, which are better than the results in Example 1.

Example 3

Example 2 was repeated except for employing a by-product mixed gas from a petroleum reforming plant. The mixed gas comprises in mole ratio 0.12% propane, 0.76% propylene, 1.22% isobutane, 8.51% n-butane, 24.00% butene-1, 50.29% isobutylene, 29.66% trans-butene, 25.03% cis-butene and 0.38% butadiene.

As in Example 2, 101.6 g. of calcium sulfite was evacuated and added with 2 g. of the mixed gas and 2.5 g. of sulfur dioxide, followed by irradiation with gamma rays at the dose rate of $1 \times 10^5$ roentgen/hr. for 1 hour. The increase in the treated calcium sulfite was less than about 0.1%. The composite was prepared from the treated calcium sulfite and tensile tests were carried out in the same way as in Examples 1 and 2. The results showed tensile strength of 142 kg./cm.² and elongation at breaking point of 34.6%. The results show that tensile strength increased by 23.5% compared with that in which the untreated calcium sulfite is employed and by 41% compared with that in which only polyethylene is employed. Incidentally, the resulting composite sheet was pure white as obtained in Examples 1 and 2. The use of a mixed gas is advantageous in its low cost.

Example 4

Example 2 was repeated except for using hexene-1 as olefin monomer. The mixture consisting of 45.5 g. calcium sulfite, 2.1 g. sulfur dioxide and 1.1 g. hexene-1 was irradiated with gamma rays at $5 \times 10^4$ roentgen/hr. for 30 minutes. The increase in weight of the treated calcium sulfite was about 0.5%. The treated calcium sulfite was kneaded with polyethylene to prepare a composite sheet of pure white color as in Examples 1–3. Tensile tests showed tensile strength of 130 kg./cm.² and elongation at breaking point of 20%. The strength increased by 13% compared with that in which untreated calcium sulfite is employed.

Example 5

52.3 g. of calcium sulfite was contacted with 4.2 g. of octene-1. The mixture was charged in reactor vessel and irradiated with gamma rays at the dose rate of $2 \times 10^4$ roentgen/hr. for 2 hours, while sulfur dioxide gas was passed into the vessel. The increase in weight was less than about 1% after unreacted octene-1 and sulfur dioxide were removed. The treated calcium sulfite was kneaded with low density polyethylene to prepare a composite sheet of pure white color, as in Examples 1–4. Tensile tests showed tensile strength of 120.3 kg./cm.² and elongation at breaking point of 16.2%. The strength increased by 5% compared with that in which untreated calcium sulfite was employed.

Example 6

The treated calcium sulfite obtained in Example 2 was mixed with high density polyethylene in the weight ratio of 1:1 and kneaded at 180° C. for 10 minutes, and then hot-pressed at 180° C. to prepare a sheet. Tensile tests showed tensile strength of 200 kg./cm.² and elongation at breaking point of 20%.

Example 7

The treated calcium sulfite obtained in Example 1 was mixed with isotactic polypropylene in the weight ratio of 1:1 and kneaded at 195° C. for 10 minutes as in Example 1, and then hot-pressed at 195° C. to prepare a glossy sheet of pure white color. Tensile tests showed tensile strength of 205 kg./cm.² and elongation at breaking point of 17%.

Example 8

An autoclave having 200 ml. inner volume was charged with 100 g. calcium sulfite as employed in Example 1 and 400 mg. azobisisobutyronitrile, and air therein was replaced with butene-1 for three times, followed by addition of 6 g. sulfur dioxide and 20 g. propylene. The autoclave was put in 60° C. theremostat vessel and kept for 5 hours, and unreacted sulfur dioxide and propylene were removed. The increase in weight of the treated calcium sulfite was about 1%.

The treated calcium sulfite was kneaded, hot-pressed and tested as in Example 1. Tensile tests showed tensile strength of 131 kg./cm.$^2$ and elongation at breaking point of 17.1%.

Example 9

A pressure-proof glass ampoule was charged with 12 g. butene-1 and 15 g. sulfur dioxide, evacuated under vacuum and sealed. The ampoule was put in 10° C. thermostat vessel and irradiated with gamma rays from Co-60 and the dose rate of $2 \times 10^5$ roentgen/hour for 1 hour. After removing unreacted monomer, 24 g. of white poly(butene-1 sulfone) was obtained. The resulting 0.1–1.5 g. polymer was dissolved in 100 cc. acetone respectively. 99.9–98.5 g. of calcium sulfite powder was added to the solution and mixed up, followed by removing acetone at room temperature and then under reduced pressure at 50° C. for 5 hours.

The calcium sulfite coated with various amounts of poly(butene-1 sulfone) was mixed with commercial low density polyethylene in the weight ratio of 1:1. The mixture was kneaded, hot-pressed, stamped and tested as in Example 1. The results are shown in Table 2. It is noted that strength increased by 15–18% compared with that in which untreated calcium sulfite was employed.

TABLE 2

Characteristics of the composite consisting of low density polyethylene and calcium sulfite treated with poly-(butene-1 sulfone).

|  | Tensile strength (kg./cm.$^2$) | Elongation at breaking point (percent) |
|---|---|---|
| Low density polyethylene | 102 | 219 |
| Low density PE and untreated calcium sulfite | 115 | 15.6 |
| Low density PE and treated calcium sulfite: Amount of polysulfone (percent) against calcium sulfite: |  |  |
| 0.1 | 132 | 18.3 |
| 0.5 | 134 | 27.2 |
| 1.0 | 136 | 20.0 |
| 1.5 | 135 | 35.9 |

Example 10

Example 9 was repeated except for using 26 g. hexene-1 and 20 g. sulfur dioxide and irradiation at room temperature (22–25° C.). A white solid polymer was obtained in 44 g. yield. The solutions of 0.05–5.0 g. of poly(hexene-1 sulfone) in 100 cc. acetone were employed and 99.95–95 g. of calcium sulfite was immersed therein. The results are shown in Table 3. It is noted that the amount 0.05% of poly(hexene-1 sulfone) against calcium sulfite is preferred.

TABLE 3

Characteristics of the composite consisting of low density polyethylene and calcium sulfite treated with poly-(hexene-1 sulfone).

|  | Tensile strength (kg./cm.$^2$) | Elongation at breaking point (percent) |
|---|---|---|
| Low density polyethylene | 102 | 219 |
| Low density PE and untreated calcium sulfite | 115 | 15.6 |
| Low density PE and treated calcium sulfite; Amount of polysulfone (percent) against calcium sulfite; |  |  |
| 0.05 | 140 | 31.1 |
| 0.1 | 132 | 25.8 |
| 0.5 | 129 | 24.8 |
| 1.0 | 129 | 27.5 |
| 5.0 | 116 | 18.8 |

Example 11

Example 10 was repeated except for using 20.8 g. octene-1 and 14.7 g. sulfur dioxide and irradiation at the dose rate of $1 \times 10^5$ roentgen/hr. for 2 hours. A white solid poly(octene-1 sulfone) was obtained in 20 g. yield. The composite sheet was pure white and showed the appearance in gloss and feeling similar to polyethylene. The tensile test results are shown in Table 4. It is noted that 0.05% of poly(octene-1 sulfone) is preferred.

TABLE 4

Characteristics of the composite consisting of low density polyethylene and calcium sulfite treated with poly-(octene-1 sulfone).

|  | Tensile strength (kg./cm.$^2$) | Elongation at breaking point (percent) |
|---|---|---|
| Low density polyethylene | 102 | 219 |
| Low density PE and untreated calcium sulfite | 115 | 15.6 |
| Low density PE and treated calcium sulfite; Amount of polysulfone (percent) against calcium sulfite; |  |  |
| 0.05 | 136 | 28.1 |
| 0.1 | 136 | 24.9 |
| 0.5 | 132 | 20.8 |
| 1.0 | 125 | 13.3 |
| 5.0 | 116 | 15.9 |

Example 12

An autoclave, with the inner volume of 200 cc., was cooled after evacuation, 6 g. of butene-1 and 30 g. of sulfur dioxide were liquefied and loaded. After the autoclave was further cooled at lower temperature and evacuated, it was irradiated by Co-60 γ-rays with the dose rate of $1 \times 10^4$ roentgen/hr. for 30 minutes. After the irradiation, the autoclave was opened in −20° C. cooling vessel, and 100 g. of calcium sulfite which had been kept at about −20° C. by adding liquid nitrogen little by little, was gradually added into the autoclave with stirring. The resulting mixture was left in the draft chamber in order to make unreacted butene-1 and sulfur dioxide evaporate, which was contained as a solvent for poly(butenesulfone). The calcium sulfite in the autoclave, of which surface was treated with poly(butenesulfone), was further degassed under reduced pressure.

The surface treated calcium sulfate, which was prepared by the above process, was white powder. The calcium sulfite was mixed with commercially available low density polyethylene in the weight ratio of 50:50, and was blended for 10 minutes at 160° C. with the rotating speed of 30 r.p.m., using a type 50 Plasticorder roller mixer, Brabender Co., West Germany. The blended material was molded into a sheet with 1 mm. thick by hot press at 160° C. The test pieces shaped in JIS No. 1 dumbbell were stamped out from the resulting white sheet and tensile test was carried out. The results showed tensile strength of 131 kg./cm.$^2$ and elongation at breaking point of 21%.

Example 13

Calcium sulfite containing 0.5% poly(butene-1 sulfone) as prepared in Example 9 was mixed with high density polyethylene in the weight ratio of 1:1, kneaded at 180° C. for 10 minutes, and hot-pressed at 180° C. to prepare a pure white sheet, as in Example 9. The tensile tests were carried out as in Example 9 and showed tensile strength of 198 kg./cm.$^2$ and elongation at breaking point of 18%.

What we claim is:

1. A calcium sulfite composition having affinity to a thermoplastic resin for preparing a calcium sulfite-thermoplastic resin composite, which comprises a calcium sulfite powder and, based upon the weight of calcium sulfite, about 0.01–5% by weight of a polysulfone resin adherent to the surface of the calcium sulfite, said polysulfone resin being a polymer having —SO$_2$— groups in the main polymeric chain.

2. A calcium sulfite composition in accordance with Claim 1, in which said polysulfone resin is a copolymer comprising sulfur dioxide and an olefin monomer, a vinyl compound monomer and/or an allyl compound monomer.

3. A calcium sulfite composition in accordance with claim 1, in which said polysulfone resin is adherent to the surface of the calcium sulfite due to copolymerizing of sulfur dioxide and an olefin monomer, a vinyl compound monomer and/or an allyl compound monomer on the surface of the calcium sulfite powder.

4. A calcium sulfite composition in accordance with claim 1, in which said polysulfone resin is adherent to the face of the calcium sulfite due to treating the surface of the calcium sulfite powder with a solution of a polysulfone resin comprising sulfur dioxide and an olefin monomer, a vinyl compound monomer and/or an allyl compound monomer.

5. A calcium sulfite composition in accordance with claim 1, in which said polysulfone resin is adherent to the surface of the calcium sulfite due to treating the surface of the calcium sulfite powder with a solution of a polysulfone resin in at least one unreacted monomer selected from an olefin, a vinyl monomer, an allyl compound monomer and sulfur dioxide, said polysulfone resin being prepared by copolymerizing sulfur dioxide and an olefin, a vinyl compound monomer and/or an allyl compound monomer.

6. A method of treating a calcium sulfite powder to impart properties suitable for preparing a calcium sulfite-thermoplastic resin composite which comprises adhering, based upon the weight of calcium sulfite, about 0.01–5% by weight of a polysulfone resin to the surface of the calcium sulfite, said polysulfone resin being a polymer having $-SO_2-$ groups in the main polymeric chain.

7. A method in accordance with claim 6, in which said polysulfone resin is a copolymer comprising sulfur dioxide and an olefin monomer, a vinyl compound monomer and/or an allyl compound monomer.

8. A method in accordance with claim 6, in which said polysulfone resin is applied to the surface of the calcium sulfite by copolymerizing sulfur dioxide and an olefin monomer, a vinyl compound monomer and/or an allyl compound monomer on the surface of the calcium sulfite powder.

9. A method in accordance with claim 6, in which said polysulfone resin is applied to the surface of the calcium sulfite by treating the surface of the calcium sulfite powder with a solution of a polysulfone resin comprising sulfur dioxide and an olefine monomer, a vinyl compound monomer and/or an allyl compound monomer.

10. A method in accordance with claim 6, in which said polysulfone resin is applied to the surface of the calcium sulfite by treating the surface of the calcium sulfite powder with a solution of a polysulfone resin in at least one unreacted monomer selected from an olefin, a vinyl monomer, an allyl compound monomer and sulfur dioxide, said polysulfone resin being prepared by copolymerizing sulfur dioxide and an olefin, a vinyl compound monomer and/or an allyl compound monomer.

11. A calcium sulfite composition in accordance with claim 1, in which said polysulfone resin is a copolymer comprising sulfur dioxide and an olefinic unsaturated monomer.

12. A method in accordance with claim 6, in which said polysulfone resin is a copolymer comprising sulfur dioxide and an olefinic unsaturated monomer.

References Cited
UNITED STATES PATENTS

| | | | |
|---|---|---|---|
| 2,780,611 | 2/1957 | TeGrotenhuis | 117—100 B |
| 3,409,585 | 11/1968 | Hagemyer et al. | 106—308 M |
| 3,480,488 | 11/1969 | Rudy et al. | 117—100 B |
| 3,544,500 | 12/1970 | Osmond et al. | 117—100 B |
| 3,687,890 | 8/1972 | Susuki et al. | 106—306 |
| 3,711,438 | 1/1973 | Susuki et al. | 260—41 R |
| 3,553,302 | 1/1971 | Susuki et al. | 260—41 R |

DAVID KLEIN, Primary Examiner

U.S. Cl. X.R.

106—306; 260—41 R; 117—100 B